United States Patent [19]

Klusmire

[11] Patent Number: 5,017,175
[45] Date of Patent: May 21, 1991

[54] BRAKE-SIZING DEVICES FOR FOOD STUFFING APPARATUS AND METHODS OF USE

[75] Inventor: Galen J. Klusmire, Carmel, Calif.

[73] Assignee: Teepak, Inc., Westchester, Ill.

[21] Appl. No.: 519,720

[22] Filed: May 7, 1990

Related U.S. Application Data

[63] Continuation-in-part of Ser. No. 312,991, Feb. 17, 1989, Pat. No. 4,932,103.

[51] Int. Cl.⁵ ............................................. A22C 21/00
[52] U.S. Cl. ..................................................... 452/38
[58] Field of Search ..................................... 452/38, 37

[56] References Cited

U.S. PATENT DOCUMENTS

| | | | |
|---|---|---|---|
| 3,317,950 | 5/1967 | Ziolko | 17/41 |
| 3,457,588 | 7/1969 | Myles et al. | 17/41 |
| 3,553,769 | 1/1971 | Myles et al. | 452/38 |
| 3,621,513 | 11/1971 | Kupcikevicious | 17/41 |
| 3,748,690 | 7/1973 | Niedecker | 17/33 |
| 3,872,543 | 3/1975 | Niedecker | 17/33 |
| 4,165,593 | 8/1979 | Niedecker | 53/413 |
| 4,438,545 | 3/1984 | Kupcikevicius | 17/49 |
| 4,467,499 | 8/1984 | Beckman et al. | 17/33 |
| 4,558,488 | 12/1985 | Martinek | 17/41 |
| 4,744,129 | 5/1988 | Weerth | 17/33 |
| 4,773,128 | 9/1988 | Stanley et al. | 17/33 |
| 4,809,403 | 3/1989 | Stanley | 452/38 |

Primary Examiner—Willis Little
Attorney, Agent, or Firm—Michael L. Dunn; R. Lawrence Sahr

[57] ABSTRACT

A highly versatile, resilient and durable food casing sizing device for regulating the release of unfilled casing from a stuffing horn is specially useful in filling casings having string tied end-closures. The sizing ring provides a high degree of product dimensional uniformity and density. The sizing device which is flexible can also be used for stuffing delicate thin walled casings, such as unreinforced thermoplastic types and collagen casings without damage. The sizing devices are especially useful in relation to the production of smaller code products stuffed in plastic or plastic coated casings.

15 Claims, 5 Drawing Sheets

BRAKE-SIZING DEVICES FOR FOOD STUFFING APPARATUS AND METHODS OF USE

RELATED CASE

This is a continuation-in-part of U.S. patent application Ser. No. 07/312,991 filed Feb. 17, 1989 now U.S. Pat. No. 4,932,103.

BACKGROUND OF THE INVENTION

The present invention relates generally to new and useful devices and methods of packaging food products, and more specifically, to an improved tubular casing brake or sizing devices for food stuffing apparatus.

In the manufacture of sausage products, a tubular food casing, such as cellulose, is loaded onto the stuffing horn of a filling machine and stuffed with an emulsion, usually comprised of comminuted meat together with fillers, seasonings, spices, etc. In the case of small sausage products, like frankfurters, the filled casings are twisted, tied, or clipped into suitable links at predetermined intervals for further processing.

For larger diameter sausage products, like bolognas, salamis, and the like, the meat emulsion is introduced into larger, heavier walled fibrous type casings or casings formed from thermoplastic films, and formed into chubs or lengthy individual sticks. Like the smaller products, these large diameter sausage products are filled on stuffing machines comprising a meat pump and a delivery attachment in the form of a stuffing horn. However, unlike small diameter products, larger type sausage products, such as bologna, packaged in large code casings, rely on heavy-duty end-closures in the form of metal clips or caps which are frequently tied with a looped string, twine or other equivalent means, all for securely containing the meat emulsion during the stuffing process and for hanging or otherwise suspending the product during further processing, e.g., cooking and smoking, storage and display. U.S. Pat. No. 4,165,593 is one example of cut lengths of casing closed at one end with a clip for securing a loop for suspending the sausage product. The casing, with an end-closure clip and loop applied to one end, are manufactured in a first operation, and later, the opened end is fitted onto the horn of a filling machine, by a meat processor in an independent operation, where it is filled and then closed at the second end.

In stuffing both small and large diameter casings a sizing or braking system can be employed for controlling casing expansion to avoid exceeding casing manufacturers recommended stuffing diameters while also preventing back "purge" of meat emulsion. This is achieved with a brake device which applies uniform pressure to the exterior wall of unfilled casing on a stuffing horn as emulsion fills the casing interior. The braking device, which may comprise a ring assembly, engages the casing, restricting its rate of withdrawal from the horn by applying pressure or drag, generated by friction, to the casing as it is pulled from the horn by the meat emulsion being filled or stuffed into that casing. Representative brake systems are disclosed by U.S. Pat. Nos. 3,748,690 (Niedecker); 3,621,513 (Kupcikevicius); 3,457,588 (Myles et al); 4,438,545 (Kupcikevicius et al) and 4,558,488 (Martinek), to name but a few.

In most brake/sizing systems compressive force is applied uniformly and circumferentially (360°) to the outer casing wall forcing it against the stuffing horn, thus creating friction between the inner casing wall and the stuffing horn and, respectively, between the outer casing wall and the brake/sizing system. The stuffing cycle typically begins with the operator loading a precut length of casing onto the stuffing horn with the first end of the casing having an end-closure, e.g. it may be tied or clipped, and it may have a looped string attached to the end-closure. The closed, first end of the casing is brought flush with the outlet end of the horn. The horn and the brake ring opening are, next, axially aligned. The brake ring assembly is then forced over the outer wall of the casing, which is on the horn, so that compressive force is applied to the casing, pushing it against the horn at a point adjacent to the outlet end of the horn. Frequently, however, in the process the looped string hanging from the clipped or capped end-closure or string tied casing becomes "locked" between the brake ring and casing side wall. Consequently, unless the string is released before stuffing is initiated, the casing is unable to peel off the horn and pressure builds up quickly at the outlet end of the horn causing the casing to rupture. This means costly down time for cleanup, lost meat emulsion, lost production and wasted casings.

Accordingly, the present invention contemplates improved sizing/braking devices for food stuffing apparatus for filling casings, string tied/looped or otherwise, which can significantly reduce snagging of the string, where used, and consequent casing rupture. This translates into economic advantage through higher production efficiency with reduced potential for down time.

A further important consideration in preparation of both large and small diameter sausage products is the maintenance of accurate diametrical and circumferential size control over the entire length of the sausage stick. It is particularly important that the diameter of the large sausage products be carefully controlled so that meat packers are able to cut the sausage into slices of predetermined thickness and diameter for prepackaging. The objective is to have a given number of slices weigh precisely a predetermined amount for each package. For the smaller products, it is critical that uniform diameters be maintained so that, for example, when the sausage product is formed into links, each link weighs the same as all other links, thus enabling the packaging of those links into standard weight containers. As a result, meat processors are constantly striving to improve operations that affect finished package yields. Constant sizing control of green stick diameter, during stuffing, assures more uniform slice and/or link weight and minimizes the over and under weight variations of the packages.

U.S. Pat. Nos. 3,748,690 and 3,872,543 to Niedecker disclose popular style sizing devices for controlling product diameter. During filling, controlled release of casing is achieved by a snubbing element bearing against the outlet end of the stuffing horn with the casing therebetween. It has been found, however, that the outlet end of stuffing horns can be fragile and subject to bending and loss of cylindrical shape unless specially reinforced. Because of distortion in roundness of horn outlets, snubbing rings, particularly those which operate by engaging the edge of stuffing horns, such as disclosed by the Niedecker patents, can fail to provide accurate product diameter control during filling operations.

Although snubbing lips of devices like those of Niedecker are fabricated from essentially resilient materials, they are nevertheless made relatively rigid and nonflexible due to steel backing members exerting pressure thereon. Consequently, desired flexibility and resiliency of such devices may be lost, to a significant degree, at the point of constriction of casing against the filling horn, making it difficult for irregular shaped folds in casing to smoothly negotiate constriction points without producing deviations in constant pressures and, ultimately, variations in product diameter. Rigid steel holders for such devices also shorten the useful life expectancy of their sizing rings due to excess wear.

Accordingly, the present invention contemplates inter alia improved flexibility and longer wearing sizing devices which offer a high degree of dimensional uniformity and caliber control without dependence on horn roundness and cylindrical shape for optimum size control during stuffing, and without casing wall thickness variations interfering with sizing ring performance.

SUMMARY OF THE INVENTION

It is a principal object of the present invention to provide for a novel food casing braking and sizing device which comprises a rounded body with an outer grooved rim, generally resembling in appearance and shape a sheave-like body or sheave wheel, a shape which is associated with a pulley block for guiding a rope or cable. The improved sizing ring comprises a resilient, sheave-like body with a central axis adapted to receive a filling horn of a stuffing apparatus having casing mounted thereon. The device frictionally engages the casing against the filling horn, when axially compressed, causing an inward distortion resulting in a reduction in inner cross sectional area transverse to the central axis which results in a pressure restriction being imposed circumferentially on the longitudinal movement of the casing, thus braking and rendering uniform the rate of release of the casing from the horn during the filling cycle. The use of the device results in void-free filled sausage products of high dimensional uniformity and consistent density for higher product yield for presliced or other packaging, notwithstanding distortion or lack of true roundness at the horn outlet. Because of the flexibility and resiliency of the sizing ring even at the point of contact with the casing, even with irregular or heavy folds, and even with variations in wall thickness, the casing is able to negotiate past the point of compression of the device against the horn with relatively constant pressure. This translates into consistent caliber control for the entire length of the stick and in void-free constant density stuffing.

It is a further principal object of the present invention to provide an improved food casing braking device comprising the resilient, generally sheave-like sizing ring with a grooved outer rim and an inner rim, in one embodiment, generally defining a straight axial bore for receiving a filling horn, in combination with housing means as a first pressure member for the sizing ring and a pressure plate as the second pressure member for axially compressing the sizing ring in the housing means. In another embodiment, the axial bore of the inner rim is double tapered, having a smaller diameter at a position on the inner rim which corresponds in position to the smallest diameter of the sheave-like shape of the outer rim. This latter embodiment is especially useful with smaller code plastic or plastic coated casings.

It is yet a further object of the invention to provide means for forcing the pressure members of the sizing ring assembly towards one another, and holding them in such position, to compress segment(s) of the ring for imparting various configurations to the sizing ring bore. For example, by axially compressing segments of the sizing ring, an elliptical cross sectional configuration, transverse to the axis, can be imparted to the sizing ring bore forming at least one gap between the sizing ring inner rim and the filling horn. This gap permits a looped string or other suspending means, affixed to one end of a casing from being locked between the inner rim of the casing brake and outside wall of the casing and stuffing horn. The sizing ring assembly concurrently restricts release of casing by imposing compressive force at other points along the inner rim for continuous and accurate size control. This significantly reduces the occurrence of casing rupture from jammed loop string, thus curtailing down time and lost production and resulting in an important economic advantage over previous efforts in this field.

It is yet another object of the invention to provide a sizing device which functions to provide an even and constant feed of smooth surfaced casing from the horn while maintaining constant size and density and without friction-loss slippage or "skipping".

It is also an object of the invention to provide for an improved method for filling tubular food casing by the steps which comprise:

(a) loading a precut food casing onto a stuffing horn, wherein the casing has first and second ends, interior and exterior walls and an end-closure at the first end with means for suspending the casing when filled, affixed to the first end;

(b) applying a casing brake to the casing loaded on the stuffing horn, the brake comprising a resilient, generally sheave-like sizing ring having a grooved outer rim and an inner rim defining an axial bore adapted for receiving the stuffing horn, the ring being axially compressed to impart an elliptical configuration to the bore, the ring encircling the exterior wall of the casing while the means for suspending the filled casing lies between the exterior wall of the casing and inner rim of the sizing ring;

(c) filling the casing with a foodstuff while simultaneously controlling the rate of release of casing from the stuffing horn and releasing the means for suspending the filled casing without rupturing the casing, and (d) closing the second end of the filled casing.

It is still a further object of the present invention to provide a method for filling a tubular food casing which includes the steps of:

(a) loading a food casing on a stuffing horn at a filling station, the casing having interior and exterior walls;

(b) applying a casing brake to the loaded stuffing horn, the brake comprising a resilient, generally sheave-like sizing ring having a grooved outer rim and an inner rim defining an axial bore, either straight or tapered, adapted for receiving the loaded stuffing horn, the sizing ring being axially compressed to circumferentially decrease the inner rim of the sizing ring, reducing its transverse cross sectional area, to engage the exterior wall of the casing, compressing them against the outer surface of the stuffing horn, and (c) filling the food casing while controlling the release of casing from the stuffing horn for dimensional uniformity.

DESCRIPTION OF THE DRAWINGS

For a further understanding of the invention as well as its characterizing features, reference should now be made to the following detailed description thereof taken in conjunction with the accompanying drawings wherein.

DETAILED DESCRIPTION OF THE INVENTION

Figure 1:
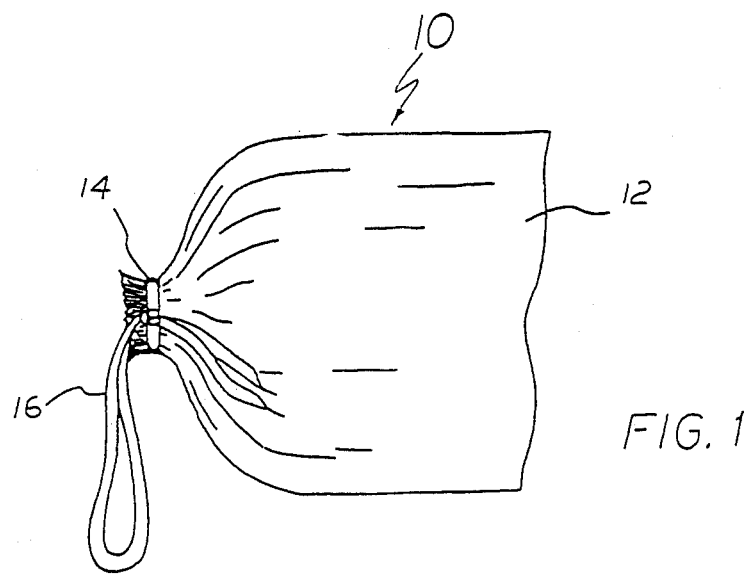
FIG. 1 is a partial view of a filled food casing with an end-closure and a looped string affixed to the end-closure.

Referring to FIG. 1, there is shown a filled sausage product 10 having an outer tubular casing 12 which may be a heavy walled fibrous reinforced type for larger diameter products. For smaller diameter products unreinforced nonfibrous type casings may suffice. Casings fabricated from, for example, collagen and thermoplastic materials, as well as other thin walled films, are also useful in practicing methods of the present invention. Before shipping to food processors for filling, clip 14 may be applied as a closure member affixed to one end of a precut length of casing, and a heavy-duty looped string or other equivalent hanger means attached thereto. Such precut casings, having various means for vertically suspending a product after filling, are widely known and, as such, form no part of the invention. Although the filled casing of FIG. 1 is shown with a conventional clip 14 and a heavy looped string/twine 16, alternative end-closures are contemplated for use with the brake assemblies and methods described herein. One example would be a metal end-closure cap and a looped string. Methods contemplated herein also include cut lengths of casing without metal clips and caps where, instead, end-closures are formed and tied off with a looped string alone, i.e., string tied casing, or where the casing, itself, is tied in a knot.

Figure 2:
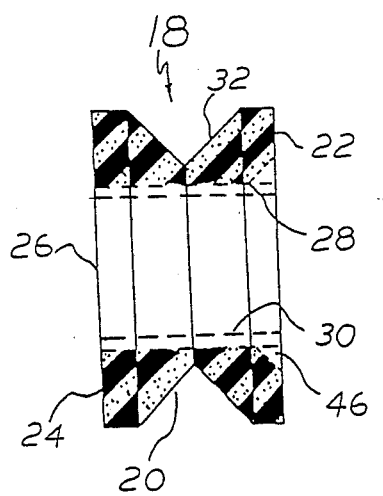
FIG. 2 is a cut-away side elevational view of the resilient sizing ring showing the grooved outer rim and internal bore configurations.
Figure 3:
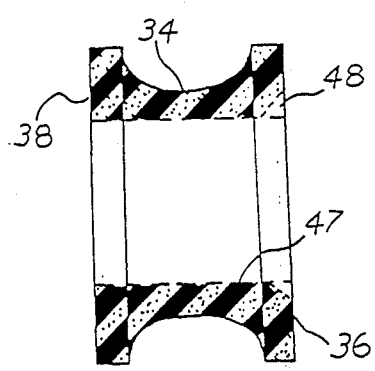
FIG. 3 is a cut-away side elevational view of an alternative embodiment of the resilient sizing ring.
Figure 4:
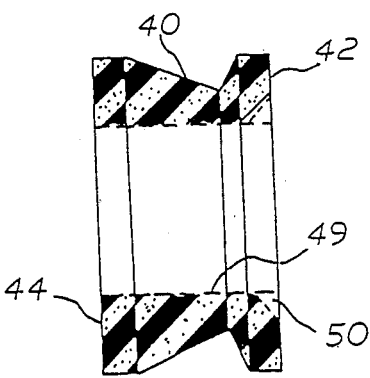
FIG. 4 is a cut-away side elevational view of yet a further embodiment of the resilient sizing ring of the invention with an asymmetrically shaped outer groove.

Casing brake 18, as shown in FIG. 2, is one embodiment readily adapted for controlling the release of casing from a stuffing horn of a filling apparatus. Brake 18 and alternative embodiments like those of FIGS. 3 and 4 provide exceptional caliber control and product uniformity for presliced type packaging with, for instance, shirred fibrous casing. But, the brake/sizing ring assemblies are especially well suited for individual precut lengths of casing like those of FIG. 1 having looped strings 16, etc., as suspending means. Heretofore, there was a relatively high level of casing breakage during filling of string tied casings, etc., because devices used for sizing control, circumferentially engaging the unfilled casing against the filling horn, did not provide the clearance needed for releasing the string lodged alongside the horn upon actuation of the meat pump. Consequently, with the string stationarily wedged between the sizing control device and the horn, unfilled casing was unable to readily peel from the horn and pressure build up would occur rapidly at the horn outlet, rupturing the casing. Hence, the sizing device of the present invention not only provide exceptional caliber control for presliced or other type products, but substantially reduces the frequency of blow-outs associated with string tied casings, etc.

Figure 6:
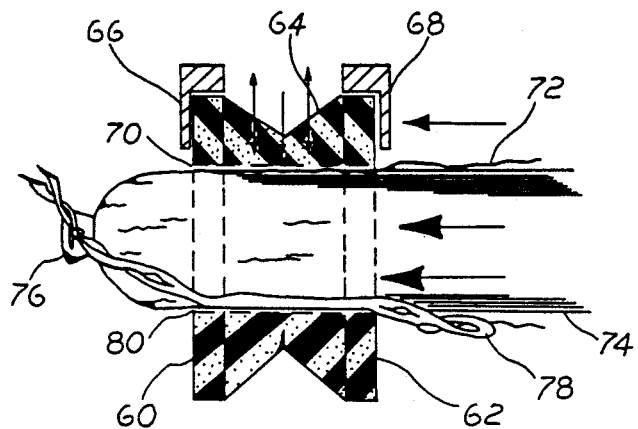
FIG. 6 is a partially cut-away side elevational view of the brake assembly over a stuffing horn around which the assembly is compressed during the filling cycle.
Figure 7:
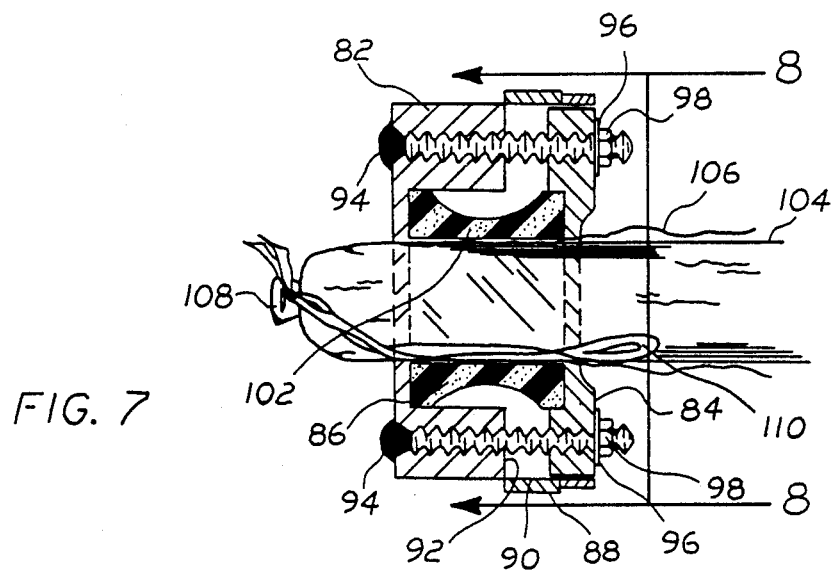
FIG. 7 is a cut-away plan view of the brake assembly including the sizing ring mounted in a housing.

The casing sizing/braking device comprises a unitized, preferably one-piece resilient, sheave-like body 18 with a grooved outer or peripheral rim 20 between first end plate 22 and second end plate 24. The brake includes a central opening or bore 26 defined by a cylindrically shaped inner rim 28 for receiving the outlet end of a filling horn shown by broken lines 30 with sufficient clearance to also accommodate a food casing as is shown in FIGS. 6 and 7. Grooved outer rim 20 may have virtually any inwardly indented sectional configuration, provided that, upon axial compression, end plates 22 and 24 produce an inwardly directed bias, or distortion, of cylindrically shaped inner rim 28 sufficient to compressively engage the unfilled casing against the stuffing horn at the time of filling. Accordingly, the peripheral outer groove 20 may, longitudinally along the axis, be either symmetrical or asymmetrical. An example of a suitably grooved outer rim having a spaced symmetrical configuration is the generally V-shaped groove 32, as shown in FIG. 2, centrally spaced between first and second end plates 22 and 24. A further representative example of a grooved outer rim is inwardly rounded or generally concave-shaped groove 34, as shown in FIG. 3, evenly spaced between first and second end plates 36 and 38.

In those instances where the cylindrical shape of the outlet end of a filling horn is distorted, not completely round or off-center, asymmetrical wedge-shaped groove 40, as shown in FIG. 4, has been found specially effective in maintaining a high level of dimensional uniformity of product produced. Groove 40 is positioned closer to first end plate 42 than second end plate 44. With axial compression of end plates 42 and 44 towards one another, casing is compressed against the stuffing horn upstream from the edge of the outlet end of the horn for more uniform controlled release of unfilled casing. Accordingly, the braking device provides the added benefit of enabling continued use of dented or damaged horns, or horns which, through constant use and handling, have lost their true cylindrical shape, especially at the outlet end, and as a result, accurate size control over the entire length of the sausage product would otherwise be lost.

Optionally, but preferably, the sizing devices shown in FIGS. 2–4 include a beveled corner edge 46, 48, 50 adjacent to the junctions of first end plates 22, 36 and 42, with inner rims 28, 47 and 49, respectively. A beveled corner edge is useful in facilitating insertion of the filling horn, loaded with casing, into the bore of the sizing ring.

Figure 5:
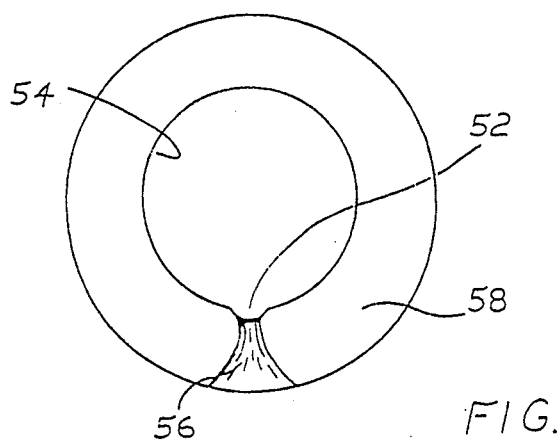
FIG. 5 is an axial end view of the sheave-like sizing ring with a funnel guide and groove in the inner rim for releasing the looped string which may be lodged between the rim and casing on the stuffing horn.

The sizing ring, as shown in FIG. 5, may also have a channel or groove 52 in inner rim 54 running parallel with the axis of the ring. Groove 52 is a useful guide or trough for a hanging looped string especially when a heavier gauge of twine must pass through the space between the inner rim of the sizing ring and the side wall of the casing. This readily assures passage of the looped hanger without rupture of the casing when filling is initiated. Groove 52 may also have a flared funnel or substantially V-shaped section 56 on the face of end plate 58. V-shaped section 56 is wider than groove 52 so it readily engages a hanging loop which is not fully aligned with groove 52. Hence, V-shaped section 56 is a useful threading means for releasing sizing device pressure on the string of, for example, string-tied casing.

The foregoing braking/sizing device sheave-like bodies 18, etc., are resilient, and may be fabricated from suitable elastomeric materials, including natural and synthetic rubbers, SBR, ABR, NBR, polyester and especially polyurethane elastomers, and other food grade polymers. In some situations, fluorinated polymers may also be useful. The braking ring can be sufficiently flexible and resilient for use even with more delicate thin walled, unreinforced casings having less mechanical strength, e.g., collagen and thermoplastic types, without damaging them during the filling process. This flexibility also provides greater resistance to wear, far exceeding the useful life expectancy of conventional type sizing rings. In this regard, the sizing rings have an indentation hardness of about 75 to about 95 on the Shore A Durometer scale, and more preferably, an indentation hardness from about 85 to 90. The flexible characteristics of the brake ring not only enable absorption (passage) of larger heavier casing folds during filling while maintaining constant pressure for a more uniform finished caliber and uniform density, but their resilient properties lessen the rate of wear to the brake ring itself. With other braking devices, such as those disclosed by Niedecker, where the brake ring is backed with a rigid steel support, compression of the snubbing lips against a horn outlet, especially one having irregularities in roundness, results in excessive wear to the snubbing lips and a shortened life span for the device.

Referring to FIG. 6, with axial compression of end plates 60, 62 relative to one another, outer rim 64, aligned with adjacent compressing means 66 and 68, is biased inwardly. The interior segment of rim 70, coinciding with the inwardly displaced portion of the braking device, engages unfilled casing 72 as it is longitudinally pulled along filling horn 74. This engagement restricts the rate of removal of casing 72, putting a drag or brake concentrically and evenly all around its circumference.

Thus, assuming an even flow of meat emulsion, at a uniform pressure and flow rate, through horn 74, and a consistent and corresponding drag or brake force on casing 72, the drag or brake force causes casing 72 to be pulled uniformly taut as it is filled with food stuff. Thus, the product diameter can be regulated and controlled. Variations on the pressure applied by inwardly displaced rim 70 on casing 72 will, within modest limits, correspondingly change the size of the filled casing 72 given an established and uniform rate of flow and pressure for the dynamic meat emulsion. Of course, too much pressure and thus, too much brake or drag can be applied, causing the casing to burst.

As will be discussed in greater detail below, some or all segments of the end plates of the device may be axially compressed for either uniform or asymmetrical applications of circumferential pressure by inner rim 70 against the outer side wall of casing 72, as well as to vary the degree of that pressure. However, as illustrated by FIG. 6, one or more segments of the brake ring need only be compressed for achieving objectives of this invention, depending on the particular casing type being used. Casing 72 includes a metal end cap closure 76 and looped string 78 attached thereto. When only a portion of inner rim 70 is forced inwardly the circular configuration of the inner rim becomes distorted sufficiently, releasing pressure enough to, in effect, open a slot 80 for passage of looped string 78 past the sizing device, unencumbered, so rupture of the casing is avoided during the filling process.

Figure 8:
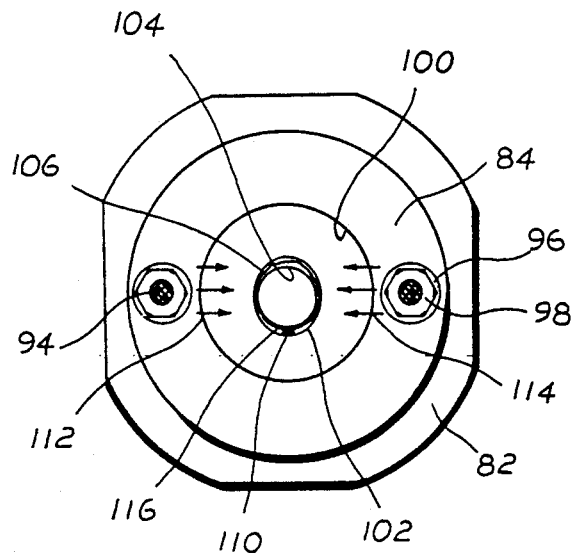
FIG. 8 is a full end view of the brake assembly with the sizing ring in the housing as viewed from the meat pump end of the brake assembly and sizing ring.

For regulating product diameter, shape and release of string or other suspending means affixed to the end of a food casing during filling, the brake assembly comprises first and second compressing means 66 and 68. However, the braking assembly preferably comprises a housing 82 and pressure plate 84 for sizing device 86, as shown in FIGS. 7 and 8. Housing 82 and, especially, pressure plate 84 is preferably fabricated from thermoplastic and thermosetting polymers and plastics, including engineering plastics, such as ABS polymers, polycarbonate resins, polyamide resins, and acetal resins like those available under the DuPont trademark Delrin. Fluorinated polymers may also be useful. In addition, the housing and pressure plate assembly may also be fabricated from suitable metals, such as, for example, stainless steel and aluminum. Preferably, the interior of housing 82 will seat resilient sizing device 86 without residual slack when in a relaxed state. Pressure plate 84 should slidably fit in the interior of housing rim 88 (FIG. 7) with sufficient space 90 remaining for axial compression of the sizing device 86 before making contact with inner ledge stop 92. Thus, in one embodiment the housing includes threaded bolts 94 at opposing segments of the housing assembly which pass through openings in the pressure plate 84. That is, pressure plate 84 is affixed to housing 82 with means for holding and moving the two components towards one another, e.g., with threaded bolts 94, washers 96 and threaded hex nuts 98 as shown by FIGS. 7 and 8 for selectively and adjustably compressing segments of sizing device 86 together with greater or equal force than other adjacent segments of the ring not having such threaded bolts, etc.

The central opening 100 of the housing and pressure plate assembly is partially filled with inner rim 102 of resilient sizing device 86 Central opening 100 is also of sufficient diameter to receive filling horn 104 loaded with casing 106 having an end-closure cap 108 and a looped string 110 held along the outer side wall of the casing and filling horn.

As threaded hex nuts 98 of the casing brake assembly are tightened against pressure plate 84, resilient sizing device 86 becomes compressed. However, because the segments of the device in the region of the bolts and nuts are under greatest compressive forces, assuming some flex of pressure plate 84, only segments of the inner rim 102, and not the whole of the inner rim 102, uniformly, are driven inwardly as shown by arrows 112 and 114 against the casing 106 and the horn 104. Inner rim 102 of resilient sizing device 86 loses its circular configuration and assumes an elliptical-like shape. As a result, a gap 116 is formed at the bottom region of inner rim 102, between inner rim 102 and filling horn 104, allowing looped string 110 to pass (slip through) without resulting in the tearing or rupturing of the casing 106 when the meat pump (not shown) is actuated for filling the casing 106.

Figure 9:
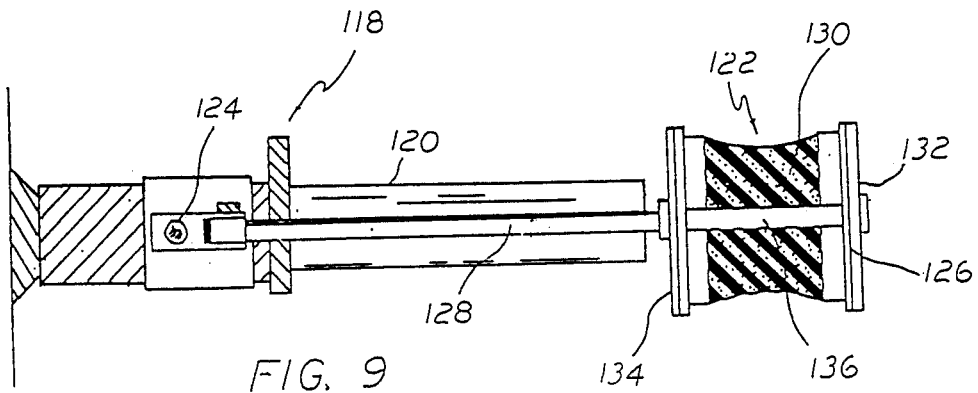
FIGS. 9-11 illustrate a progressive sequence of steps in practicing methods of the present invention.
Figure 10:
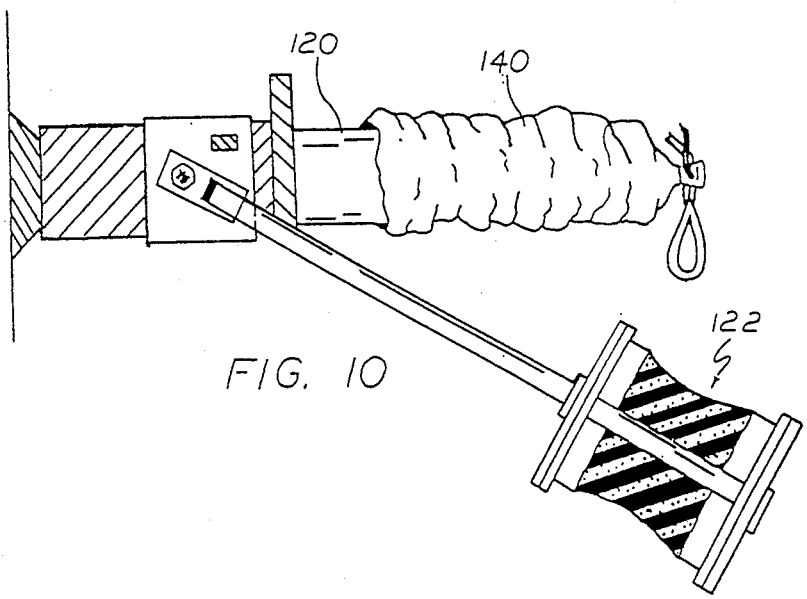
Figure 11:
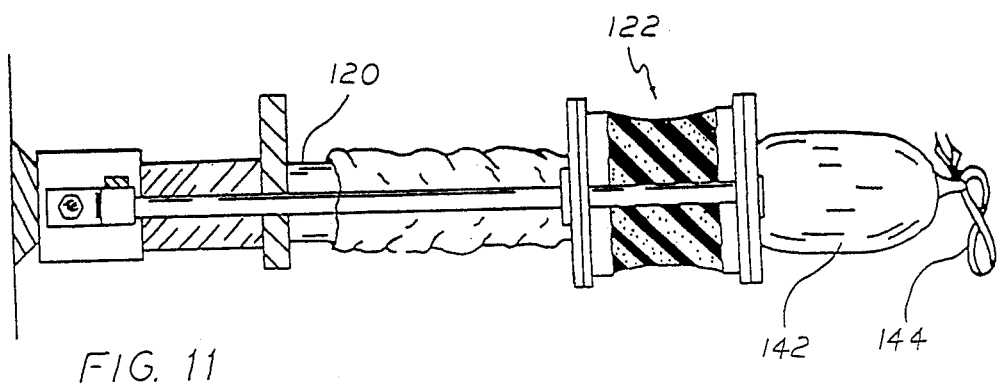

FIGS. 9–11 provide a sequence of steps for practicing methods of the invention. Typically, the food stuffing apparatus employed will have a meat pump of conventional design (not shown), a stuffing horn 120 which may be axially extendible, and the food casing brake assembly 122. Brake assembly 122 includes means 124 for pivoting sizing device 126 downwardly away from the stuffing horn and tie rods 128 for supporting the sizing device. The sizing device 126 includes the hollow sizing ring 130 having a resilient, sheave-like body, a first compression ring 132, a second compression ring 134 and screws 136 on each side of the horn for adjusting the force applied to compression rings 132 and 134 and, thus, to segments of sizing ring 130 lateral to the central axis.

FIG. 10 illustrates downward displacement of food casing braking assembly 122 away from horn 120 for loading of a cut length of string-tied casing 140 onto horn 120. FIG. 11 shows alignment of brake assembly 122 with horn 120 which is axially extended into the bore of the sizing ring 130. String tied loop 144 which is folded against the outer side wall of the casing 140 before filling is initiated, is enabled to pass through ring 130 without rupturing the casing, provided that sizing ring 130 is compressed such that both elliptical configuration of the bore thereof is formed, and the release of unfilled casing from the stuffing horn is simultaneously regulated for diametrical size control.

Figure 12:
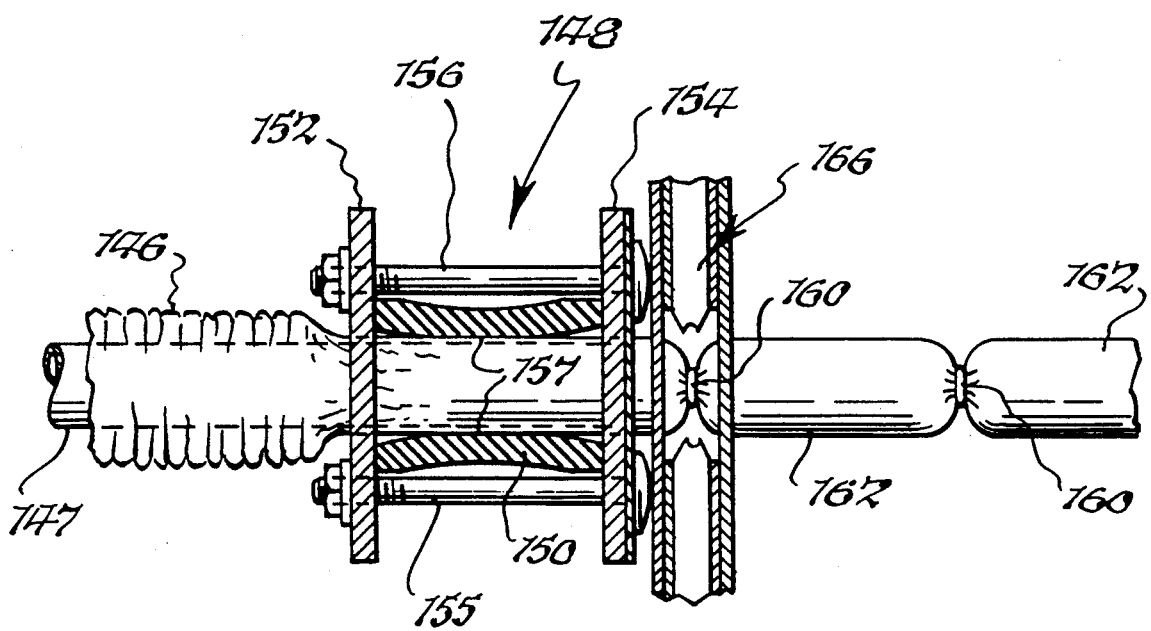
FIG. 12 is a cut-away plan view of the brake system employed in stuffing and clipping shirred casing.

Methods of the present invention have been illustrated thus far principally in connection with precut lengths of string-tied casing. However, the invention also contemplates methods of filling shirred casings, both fibrous and nonfibrous reinforced types, including thermoplastic types without string-tied end-closures. This also includes 72 inch long casings—Code 9 (4.65 caliber) for slicing, as well as smaller codes in the 1½–2½" diameter range. FIG. 12 demonstrates one application of shirred casing in filling smaller diameter clipped sausages. Sizing ring 150, having a resilient, sheave-like body, is axially engaged at opposite ends with compression rings 152 and 154, respectively, which, in turn, are affixed with connecting screws 155 and 156 for adjusting the force exerted on sizing ring 150. Compression ring 152 may be a rigid metallic member which does not warp or flex when forced against the sizing ring by the tightening of connecting screws 155 and 156. The objective of the embodiment of FIG. 12 is to apply uniform axial compressive pressure to sizing ring 150 at all segments of the ring's peripheral edge so that the inner rim 157 of the sizing ring uniformly circumferentially engages (360°) the casing 146 on the stuffing horn 147, applying uniform and equalized pressure at all points around that circumference, thus resulting in the preparation of straight, dimensionally uniform sausages 162. The leading and trailing ends of each sausage may be, for example, tied off at clipper 166 with metals clips 160.

In producing smaller code sausage products, having diameters in the range of about 1½" to about 2½", in many cases plastic coated fibrous casings and, simply, straight plastic casings are used. The smaller codes require more force to expand them, based on the basic principles of hydraulics. Because more force is required, the braking/sizing device is required to exert increased pressure on the casings in comparison to that which is required for the production of larger code products. The plastic materials, either in the form of casing coatings or as casing materials, per se, tend to exhibit higher strengths and are less prone to bursting under increased filling pressures. That is to say, such casings tend to expand to a greater degree under pressure before exceeding their strength capacities in comparison to casings made from other materials.

Because plastics tend to have a higher degree of surface lubricity than other types of casing materials, it is more difficult to apply effective braking to such casings, whether plastic coated or straight plastic, in comparison to other materials. The compressive force applied to the outer casing wall must be increased to overcome the lubricity and to apply sufficient drag or braking force to ensure uniform sizing and density of the sausage product being stuffed. Yet the compressive force cannot be increased to the point where it causes the casing to burst.

As explained previously, casings which are packed onto the horn are not necessarily uniform; there are variations in the wall thickness of the casings and some variations in the diameter of the casing. In addition, the casing which is mounted onto the horn is done so in accordion fashion with the accordion pleats being variable and the bends forming those pleats being variable. In other words, within the parameters of the casing size, the accordion pleating of the casing, as mounted on the horn, is random, thus the force to pull it out of the accordion pleated set, before it even reaches the braking/sizing device, can vary somewhat both longitudinally and transversely from point to point around the circumference of the casing.

As is well known, there is a significantly greater amount of force required to overcome the effects of static fraction than that which is required to keep something moving in a dynamic friction situation. Because of the relatively high degree of compressive force required to be imposed onto plastic casing or plastic coated casing by the brake/sizing device, when producing smaller code (1½"–2½" diameter) sausage products, a greater degree of force is required to get the casing moving between the brake/sizing device and the horn. This is not a problem in start-up as there tends to be a modest impact imposed against the closed end of the casing by the meat emulsion as it is pumped through the horn. The problem occurs when, due to size and thickness variations and the random nature of the accordion pleats, there is a variation, amounting to discrete points of hesitation, of the movement of the casing as it enters the brake/sizing device. Due to the difference in force required vis-a-vis that required for overcoming static friction in comparison to that required for overcoming dynamic friction, the filling case, following the exit from the brake/sizing device tends to exhibit slip or "skip" hesitation in its movement, with variations in speed of exit and in amount of stretch and with momentary stop-start jerking movements. As might be expected, this causes havoc with the uniformity of product size and density.

Figure 13:
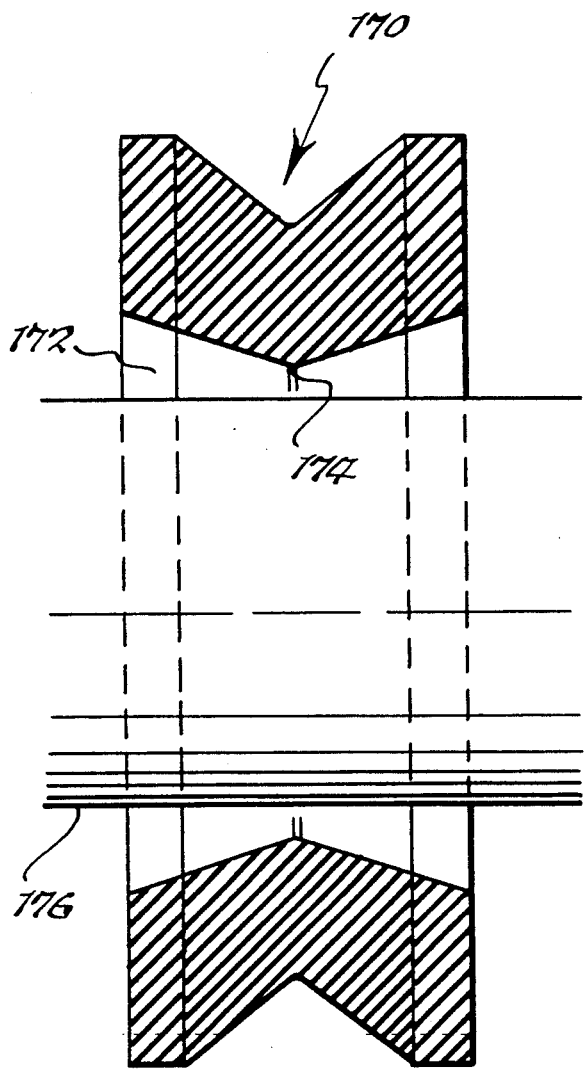
FIGS. 13 and 14 are cut-away views of an embodiment of the casing brake which is particularly useful with small code and plastic or plastic coated casing.

An embodiment of the present invention overcomes this problem. Referring to FIG. 13, there is shown a modified casing brake 170 which is identical, in all respects, to casing brake 18 shown in FIG. 2, except there is a double taper to the bore 172 in the form of a "V". As seen in FIG. 13, casing brake 170 is in a state where no compressive pressure is being exerted on it, axial or otherwise. The tip 174 of the "V" is spaced apart from the horn 176 as shown in FIG. 13.

Figure 14:
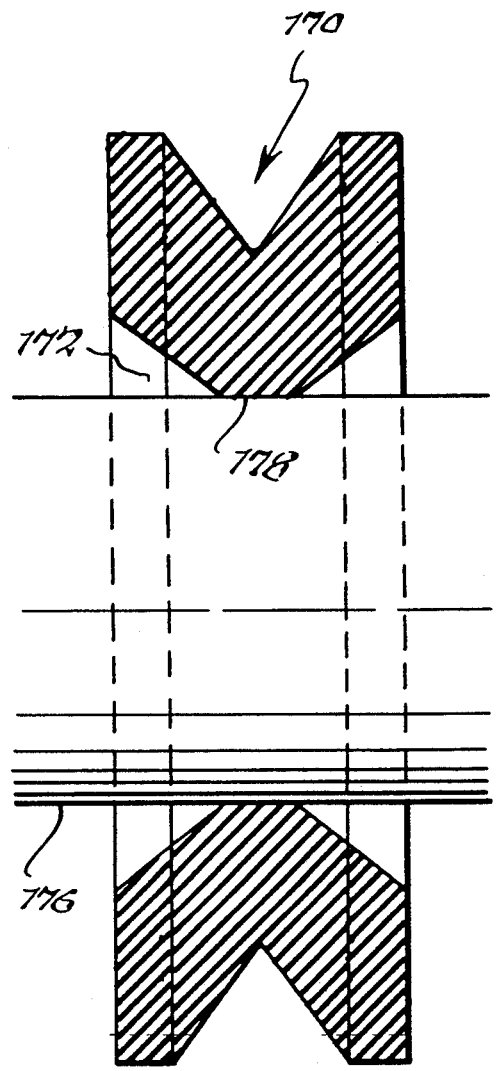

The same casing brake 170 is shown in FIG. 14, but this time with the requisite axial compressive force applied by any one of the means described previously in relation to the illustrations of FIGS. 6–8 and FIG. 12. The tip 174 of the "V" shown in FIG. 13 is transformed into contact area 178 in FIG. 14 by compression against horn 176 with the casing (not shown in FIGS. 13 and 14) therebetween. As will be noted in comparing FIG. 14 to, for example, FIGS. 6 and 7, the area of contact between the casing brake and the horn, with the casing therebetween, is substantially less for FIG. 14.

Tests have shown that the use of casing brake 170 with small code casing in the range of about 1½" diameter to about 2½" diameter, where the casing material is plastic or plastic coated, substantially eliminates the slip or "skip" phenomena otherwise experienced, thus restoring size and density uniformity to the sausage products being produced.

Although the invention has been described in considerable detail with respect to the preferred embodiments thereof, it will be apparent that the invention is capable of numerous modifications and variations to those skilled in the art without departing from the spirit and scope of the invention as defined in the appended claims.

What is claimed is:

1. A food casing braking device, which comprises a resilient, generally sheave-like sizing ring in combination with means for pressing together said sizing ring, said sizing ring having a grooved outer rim and an inner rim defining a double tapered bore for receiving a filling horn of a stuffing apparatus, said sizing ring being adapted to compress against the food casing and said filling horn when axially compressed.

2. The food casing braking device of claim 1 wherein the outer rim of the sizing ring comprises a symmetrically shaped groove.

3. The food casing braking device of claim 1 wherein the outer rim of the sizing ring comprises an asymmetrically shaped groove.

4. The food casing braking device of claim 2 wherein the outer rim of the sizing ring comprises a substantially concave-shaped groove.

5. The food casing braking device of claim 2 wherein the outer rim of the sizing ring comprises a substantially V-shaped groove.

6. The food casing braking device of claim 3 wherein the outer rim of the sizing ring comprises an off-center, generally U-shaped groove.

7. The food casing braking device of claim 1 wherein the inner rim of the sizing ring includes groove means running generally with the axial bore.

8. The food casing braking device of claim 1 wherein said sizing ring comprises first and second end plates and said means for pressing together said sizing ring comprises first and second compressing means for engaging opposite sides of said end plates.

9. The food casing braking device of claim 8 wherein the outer rim of said sizing ring comprises a symmetrically-shaped groove.

10. The food casing braking device of claim 8 wherein the outer rim of said sizing ring comprises an asymmetrically-shaped groove.

11. The food casing braking device of claim 8 wherein said first compressing means comprises means for housing said sizing ring and said second compressing means comprises a pressure plate for pressing together said sizing ring in said housing means.

12. The food casing braking device of claim 8 including means for holding the first and second compressing means towards one another for compressing segments of the sizing ring together with greater force than other segments to impart an elliptical configuration to the sizing ring axial bore and for forming at least one gap between said inner rim and filling horn.

13. The food casing braking device of claim 8 including means for holding the first and second compressing means towards one another for expanding the sizing ring inner rim inwardly to engage casing on the filling horn circumferentially.

14. The method for filling a tubular food casing which comprises the steps of:
    (a) loading a food casing on a stuffing horn at a filling station, said casing having interior and exterior walls;
    (b) applying a casing brake to said loaded stuffing horn, said brake comprising a resilient, generally sheave-like sizing ring having a grooved outer rim and an inner rim defining a double tapered bore for receiving the loaded stuffing horn, said ring being axially compressed to circumferentially expand the inner rim of the sizing ring to engage the exterior wall of said casing, and
    (c) filling the food casing while controlling the release of casing from the stuffing horn for dimensional uniformity.

15. The method of claim 14 wherein the casing is a member selected from the group consisting of cellulose, fibrous reinforced cellulose, thermoplastic, and collagen.

* * * * *